June 9, 1925. 1,540,861
J. POSPESHIL
CEMENT BRICK AND BLOCK MACHINE
Filed Oct. 4, 1923 2 Sheets-Sheet 1
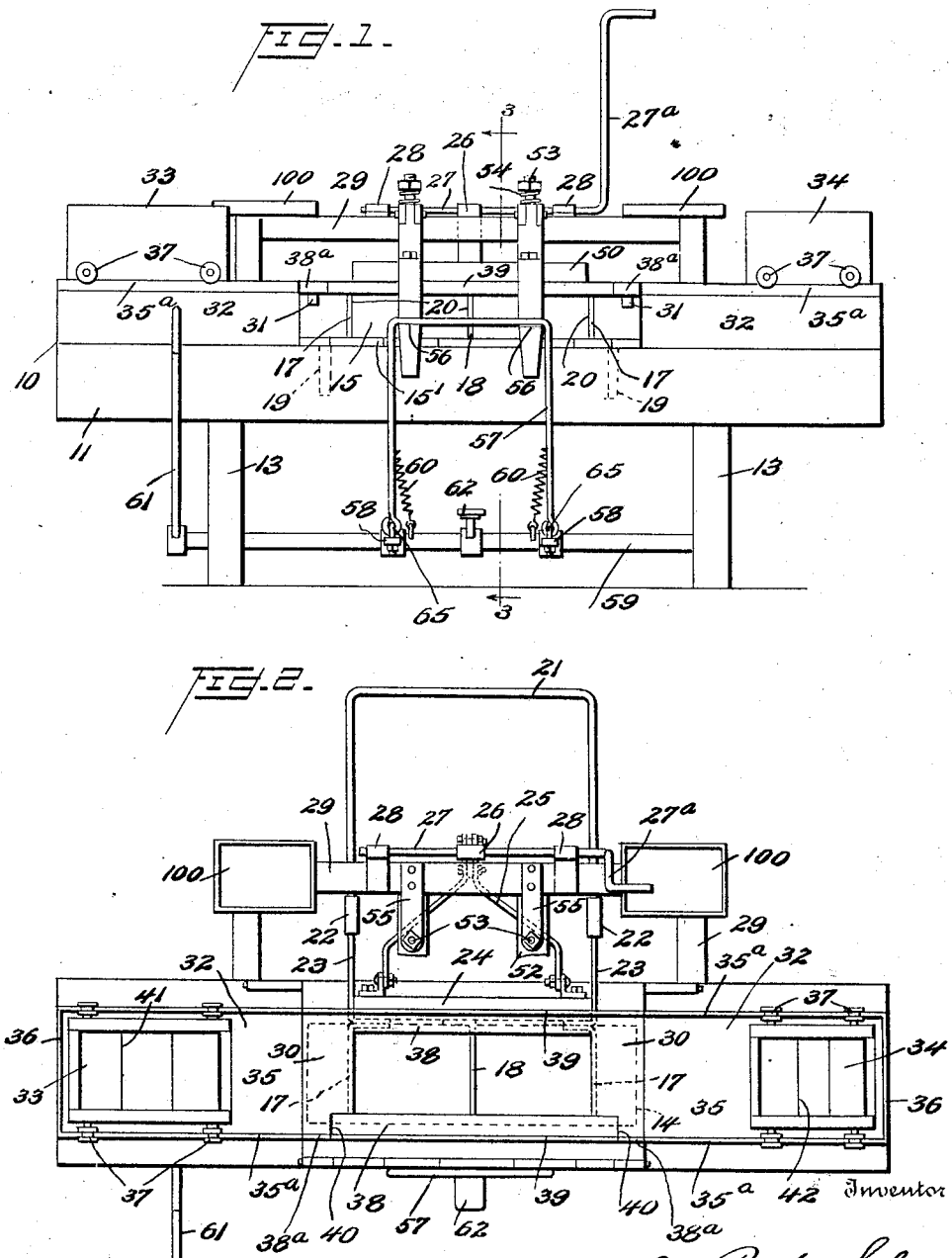

June 9, 1925.                  1,540,861
J. POSPESHIL
CEMENT BRICK AND BLOCK MACHINE
Filed Oct. 4, 1923          2 Sheets-Sheet 2
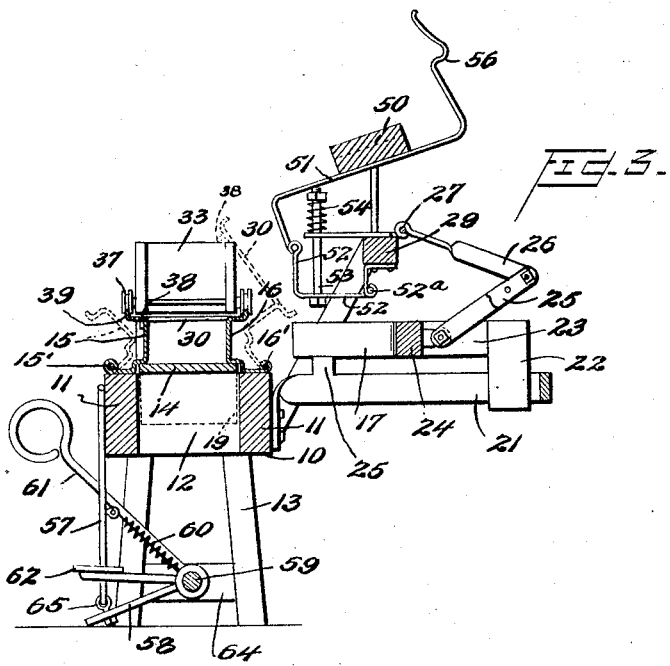
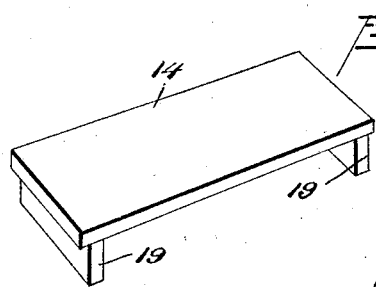
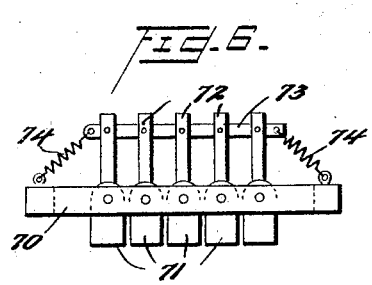
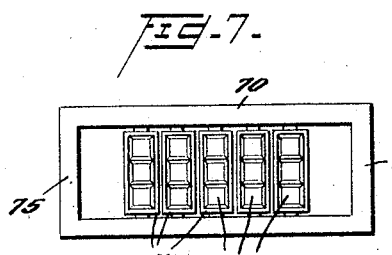

Patented June 9, 1925.

1,540,861

UNITED STATES PATENT OFFICE.

JOHN POSPESHIL, OF VENUS, NEBRASKA.

CEMENT BRICK AND BLOCK MACHINE.

Application filed October 4, 1923. Serial No. 666,624.

*To all whom it may concern:*

Be it known that I, JOHN POSPESHIL, a citizen of the United States, and residing at Venus, Knox County, State of Nebraska, have invented certain new and useful Improvements in Cement Brick and Block Machines, of which the following is a specification.

This invention relates to machines for molding bricks, particularly for molding faced blocks or bricks of cement or concrete. The principal objects of the invention are to provide an improved and simplified arrangement of supporting means and various operative parts of the mold in general whereby the process of molding bricks can be carried out more conveniently and expeditiously than heretofore, to provide improved means for filling the mold with body mixture and facing mixture, to provide improved means for facing the brick, and to provide improved means for removing the freshly molded bricks from the machine so that they may be readily and compactly stored for drying without re-handling. Other objects will be apparent from the following description and accompanying drawings, in which:

Fig. 1 is a front elevation of a brick machine constructed according to my invention with the tamper in position in the mold;

Fig. 2 is a top plan view of the same with the tamper removed for the sake of clearness;

Fig. 3 is a section on the line 3—3 of Figure 1;

Fig. 4 is a perspective view of a pallet;

Fig. 5 is a detail view of a hinge;

Fig. 6 is a side elevation of a special form of block facing means; and

Fig. 7 is a view of the latter from below.

In general, the machine is composed of a bench for supporting the miscellaneous parts of the apparatus and a mold or form, hoppers for filling the mold with cement or concrete mixture, tampers for packing the mixture and suitable treadles and levers for operating the tampers and other movable parts of the mold. In the embodiment illustrated a bench 10, comprising side members 11 and cross pieces 12 is supported on any suitable legs or framework 13. The mold is disposed at the center of the bench, being composed of a bottom or pallet board 14, side walls 15 and 16, end walls 17 and one or more separators or partitions 18, all of which are constructed and arranged as follows:

The pallet, as shown in Fig. 4 is a flat board 14, on which the bricks are molded, and it is provided with a depending leg 19 near each end, the legs being somewhat longer than the height of the bricks to be molded so that the pallets with freshly molded bricks thereon may be removed from the machine and stacked one upon another without injuring the bricks. The pallet is supported at its ends on the cross pieces 12 of the bench, its surface being slightly above the top of the side members 11, with its legs 19 extending downwardly between them and between cross pieces 12, as shown in Figure 3. The side walls 15 and 16 are pivoted to the outer edges of the side members 11 by hinges 15' and 16' and are adapted to be swung either into vertical position to constitute the sides of the mold as shown in solid lines in Figure 3, or to be swung outwardly, as shown in dotted lines in the same figure, to permit removal of the pallet board. The walls 15 and 16 are suitably shaped to fit the corners of the pallet snugly. The side walls 15 and 16 have a number of vertical slots 20, those in the wall 15 corresponding exactly in longitudinal position with those in the wall 16, which slots constitute means for receiving and holding in place the end walls 17 of the mold and the intermediate walls 18 serving as separators forming separate sections of the mold. The walls and separators are slidable longitudinally into and out of operative position through the slots in the wall 16, and when their ends enter the slots in the wall 15, are in operative position. In order that the members 17 and 18 may slide in and out conveniently, the following mechanism is provided in the outer side of the wall 16. A suitable guide bracket 21 is secured to one side member 11 of the bench, as shown in Figure 3. Sleeves 22 are slidably mounted on this bracket and are rigidly secured to arms 23 which are in turn attached to a bar or header 24 and the vertical end and separator walls 17 and 18, are secured at their outer ends to this header. A guide bar or rest 25 on the bracket 21 near and parallel to the side wall 16, supports the strips 17 forming walls 17 and 18 in the proper position to enter the slots 20 when the header 24 is moved inwardly. The header 24 is provided with a link 25 pivoted at one end and pivotally connected at its other end to one end of an arm 26 which is rigidly secured at its other end to a shaft 27 turning in bearings 28 mounted on the upper outer edge of a bar 29 above and parallel to the header 24 and connected to the adjacent side of the bench by outwardly inclined arms 63 at each end. The shaft 27 is integral with or secured to a crank or hand lever 27$^a$ for turning it, as shown in Figs. 1 and 2, and when turned it operates through the linkage just mentioned to reciprocate the header 24 with its supporting arms 23 and sleeves 22 by a sliding motion on bracket 21 and thus the end and separator walls secured to it move into and out of operative position across the mold. As shown in Figures 1 and 2 the end slots are so disposed that the end walls of the mold are a short distance from the ends of the pallet board, that is, between the legs 19 of the pallet 14 so that no brick material is deposited on the ends of the pallet board.

It is desirable to keep these ends of the pallet clean, both for convenience in handling the pallets and in order to permit the stacking of the pallets without the interference of deposited material. In order to prevent accidental dropping of material on the ends of the board, I provide a shield member 30 securely fastened by any suitable means to each end of the side wall 16 and at right angles thereto, as shown in Figures 2 and 3. When the side walls are in operative position, as indicated by solid lines in Figures 1 and 3, these shield members extend horizontally over the ends of the pallet at the level of the top of the mold. As shown in Figure 2 the end walls 17 are just under the inner edges of the shield pieces. The shields also act as locking members to hold the side walls 15 and 16 in operative position. When the walls 15 and 16 are in vertical position, the shields extend over the top edge of the wall 15 and a depending lug 31 on the adjacent end of each shield piece engages the upper edge of the vertical portion of the side wall 15 and prevents both side walls from turning outward on their pivots. In order that the end of the shield carrying the lug 31 may pass across the vertical portion of side wall 15 at the top of the mold and permit the lug to engage it the parts of the side wall 15 above the top of the mold are removed from the lines 40 Fig. 2 to the ends of said wall. When the end walls are moved into the mold through the slots in 16, they also hold the side wall 16 firmly in position.

It will be seen by reference to Fig. 1 that there are elevated portions 32 on the bench extending from its ends approximately to the space occupied by the mold. The upper surfaces of these elevated portions are flat and in substantially the same horizontal plane as the upper edges of the vertical walls of the mold, the said surfaces being preferably composed of sheet metal plates 35 extending substantially throughout the length of said elevations and having upturned side edges 35$^a$ forming trackways for movable hoppers for material as will be described. They extend to the adjacent edges of the shields 30 which are over the end walls of the mold and there is thus formed a substantially continuous horizontal surface on which material may be moved from the outer ends of the elevated portion of the mold and their outer ends 36 are turned upwardly to serve as stops to limit the outward movement of the movable hoppers above mentioned. The hoppers 33 and 34 (Fig. 1) are in the form of rectangular boxes with open tops and discharge openings in their bottoms supported by grooved wheels 37 on the trackways 35$^a$ on which they are adapted to roll in moving, the lower edges of the discharge opening being between the trackways and sufficiently close to the surface of the sheet metal plates 35 to prevent the escape of material under them whereby said plates serve as bottom closures for the discharge outlets of the hoppers. In order that the trackways for the hoppers may extend to and along the sides of the mold so as to permit the hopper to pass over it the ends 38$^a$ of the shield pieces 30 are turned upwardly, as shown in Figs. 1 and 2 forming sections of the trackway in line with one of the trackways 35$^a$ and the upper portions of the side walls 15 and 16 include outwardly extending horizontal portions 38 with outer upturned edges 39 forming sections of the trackway in alignment with the others thus forming together a continuous trackway for the hoppers. The interior transverse width of the discharge outlets of the hoppers 33 and 34 is substantially the same as that of the sections of the mold and they are of course supplied with the desired amount of material in the position shown in Figs. 1 and 2 and are then moved along the trackway into position to discharge the contents into the mold by gravity.

This machine is designed primarily to mold faced cement bricks which are made of a body of cement or concrete and a relatively thin facing of cement usually of a finer texture and containing a larger percentage of water than the mixture constituting the body portion. In order that the proper quantity of each of these mixtures may be applied conveniently, I make the hopper 33 sufficiently large, to hold just enough body mixture to fill all of the sections of the mold nearly full, say to within a half inch of the top. As this mixture is relatively coarse and dry, it flows slowly, and the feed opening 41 in the bottom of this hopper is of such size that the hopper is emptied in a single passage over the mold at such predetermined speed that each division or section of the mold is filled to the same height. The facing mixture, however, is of relatively fine texture and may be quite wet, so that it flows more readily and a smaller quantity of facing mixture than of said body mixture is used, and therefore in order to supply the desired amount to each mold section, the feed opening 42 in the hopper 34 is relatively small to reduce the rate of flow and make it easier to supply the proper quantity of facing mixture to each section of the mold in a single passage of the hopper at predetermined speed over the mold. This hopper may be relatively small so as to hold only one charge of facing mixture if desired, but since the hopper 34 completes the filling of the mold and since spilling is prevented by the shields 30 and lateral extensions 38, the hopper may hold several charges and may be passed over the mold and back without wasting material.

The means for compressing the material in the mold is supported by the bar 29 extending longitudinally of the mold at a material distance laterally from it and at a greater elevation than the top of the mold. It includes L-shaped brackets 52$^c$ secured to the lower face of bar 29 near its ends having their downwardly extending portions pivotally connected at their lower ends by a small rod 52$^b$ to one end of an L-shaped metal strip having a horizontal portion 52$^a$ extending towards the mold in a plane slightly above its top and an upright portion 52. The portion 52$^a$ is normally supported in horizontal position by a screw threaded bolt 53 passing vertically through it and through an arm 55 rigidly connected to the bar 29 and the coiled spring 54 between it and the adjusting nut on the upper end of bolt 53. Elongated strips of metal 51 are pivotally connected at their outer ends to the upper end of portion 52 and at a distance from the pivot equal to the length of portion 52 are bent at right angles outwardly and upwardly from the mold and extend from that bend in a straight line a sufficient distance to pass across and beyond the top of the mold and to the outer side of the bench and are there bent on an angle slightly greater than a right angle and in the opposite direction from the first bend. The portion beyond said last mentioned bend has an outwardly projecting portion 56 on curved lines having the form of a hook with the end portion beyond the hook inwardly inclined. A tamper 50 which is of such size and shape as to closely fit the interior of the mold, is secured to the intermediate straight line portions of the pivoted strips 51 in such position that it will enter the top of the mold when said strips are turned from the position shown in Fig. 3 to horizontal position. When the tamper is turned on its supporting pivot to horizontal position over the mold the hook 56 is engaged by a part of mechanism operated by a foot pedal for moving it downward and compressing the material in the mold. That mechanism includes a shaft 59 mounted in bearings in cross bars 64 secured to the legs 13 of the bench near their lower ends having a foot pedal 62 secured thereto and projecting slightly beyond the opposite side of the machine from that carrying the bar 29, see Fig. 3. Arms 58 are also rigidly connected at their inner ends to shaft 59 and extend in the same direction as said foot pedal 62 but at a downward angle thereto. A latch 57 consisting of a small rod in the form of an inverted U is pivotally connected at its ends to the outer ends of arms 58 by eye bolts 65 and coiled springs 60 under tension are connected to it at approximately midway position between its upper and lower ends and to the shaft 59, as shown in Figs. 1 and 3, thus yieldingly holding the upper horizontal portion of the latch 57, corresponding to the base of the U, close against the outer side of the side member 11 of the bench. A hand lever 61 for manually turning shaft 59 is secured at its lower end to one end of said shaft and projects upwardly and outwardly to convenient position for the operator on the same side as but materially above the foot pedal. In the form shown the ends of arms 58 normally rest on the support for the machine, as shown in Fig. 3, and when the tamper 50 is turned to horizontal position over the mold this hand lever 61 is turned upwardly causing the horizontal upper portion of latch 57 to move upwardly and outwardly in contact with the outer surface of the inclined end portion of the metal strip 51 beyond the hook 56 until it snaps into engagement with hook 56 through the tension of spring 60. The foot pedal 62 may then be used to move the tamper downwardly in the mold to compress the material. Although in the particular form shown it is necessary to manually move the compressing mechanism to so engage the tamper mechanism before exerting pressure on the material in the mold, the invention is not limited thereto since it will be noted that the structure is such that if the arms 58 were yieldingly supported in proper position the inclined end portion of the tamper carrying strip 51 beyond the hook 56 would automatically enter between the upper horizontal portion of the latch and the side wall of member 11 and move downward until that portion snapped into engagement with hook 56 as the tamper is brought to horizontal position over the mold and thus it would only be necessary to operate the foot pedal to apply pressure to the material in the mold.

Tool shelves 100 may be placed on the bracket 29 wherever convenient.

For giving the desired finish, or "air face" to the brick, I provide a special form of tamper for use on the facing mixture. This may be placed on the machine in the same manner as the tamper 50, if desired, but for the sake of convenience is shown as a hand operated tamper, see Figure 6. It comprises a frame 70 and a number of print blocks 71 (one for each compartment of the mold) pivoted therein. An arm 72 is secured to each block, the upper ends of the arms being joined together by being pivoted to a bar 73 which is connected to each end of the frame by a spiral spring 74. The end bars of the frame conveniently serve as handles 75 by which the tamper may be applied and worked in the mold. The bottom faces of the prints or tamping blocks are hollowed or cupped as shown at 76, the hollows being suitably roughened, if desired.

In operating the machine the pallet 14 is placed in position, then the side walls 15, 16 turned to upright position and then the end walls 17 and intermediate separator walls are moved longitudinally through the slots in wall 16 into position extending transversely across the mold by turning shaft 22 through hand lever 27ª and this completes the mold ready to receive a charge of material. The hopper 33 at the outer end of the trackway is then supplied with sufficient material for the body portion of the bricks to fill the sections of the mold to the desired extent and is then moved to and over the mold discharging the proper amount of material in each section and is then moved back from the mold. The supporting strip 51 carrying the tamper 50 is then turned on its pivot until the tamper is just above the mold and the end having hook 56 is on the other side of the mold. The latch 57 is then raised by the hand lever 61 and brought into engagement with said latch and the foot pedal 62 is then pressed downward causing the tamper to descend in the mold compressing the material in it. It will of course be understood that the tamper is in sections corresponding to the sections of the mold. The tamper is then turned back to inoperative position.

The facing material is next supplied to hopper 34 at the outer end of the trackway and is moved along the trackway to and over the mold thus depositing a rather thin layer of that material on top of the compressed material already in the mold. The portable hand operated tamper 70 is then brought into operation to give the surface the desired finish and physical form or design. It is placed in the mold with one section 71 in each section or compartment of the mold and the frame or bar 73 moved back and forth to oscillate the sections 71 thereby causing the material to gradually assume the form of and fill the downwardly facing cup-like recesses 76 in the tamper sections. The arms 72 are then allowed to be returned to vertical position by the springs, and the tamper is lifted out of the mold. The recesses 76 act as suction cups and draw up the mixture in minute ridges, pinnacles and striæ which give the desired rough effect and a pleasing appearance.

The separating members are then withdrawn, the side walls swung back, the pallet is lifted out and stored to allow the brick to dry. A new pallet is inserted and the operation repeated.

It is to be understood that the invention is not limited to the particular details of construction which I have described for the sake of illustration, but includes such changes and modifications as fall within the scope of the appended claims.

Having thus described the invention what I claim as new and desire to be secured by Letters Patent is:

1. A brick molding machine comprising in combination, a support having a portion provided with a flat horizontal surface, a mold at the end of said surface having the upper edges of its end walls in the same plane as said surface, a movable hopper for supplying said mold with material and parallel runways on said surface and along the upper edges of the side walls of said mold for supporting and guiding said hopper, said mold including a removable bottom pallet, side walls with horizontal lower edges pivoted at their outer sides to a part of said support for turning outwardly, and end walls removable in a vertical plane.

2. A brick molding machine comprising in combination, a support having a portion provided with a flat horizontal surface, a mold at the end of said surface having the upper edges of its end walls in the same plane as said surface, a movable hopper for supplying said mold with material and parallel runways on said surface and along the upper edges of the side walls of said mold for supporting and guiding said hopper, said mold including a removable bottom pallet, side walls with horizontal lower edges pivoted at their outer sides to a part of said support for turning outwardly, and end walls removable in a vertical plane, the said pallet being materially longer than the mold and having transversely and downwardly extending legs secured to its lower surface near its ends for supporting and stacking the bricks when formed.

3. A brick molding machine comprising in combination, a support having a portion provided with a flat horizontal surface, a mold at the end of said surface having the upper edges of its end walls in the same plane as said surface, a movable hopper for supplying said mold with material and parallel runways on said surface and along the upper edges of the side walls of said mold for supporting and guiding said hopper, said mold including a removable bottom pallet, side walls with horizontal lower edges pivoted at their outer sides to a part of said support for turning outwardly, and end walls removable in a vertical plane, the side walls being composed of sheet metal outwardly turned at right angles at their lower and upper edges the outer margins of the upper outturned portions being turned upwardly forming part of the trackway for the hopper and the flat horizontal surface being formed of sheet metal with upturned side edges forming trackways for said hopper in alignment with said trackways of said sides of the mold and wheels connected to said hopper and resting on said trackway.

4. A brick molding machine comprising in combination, a support having a portion provided with a flat horizontal surface, a mold at the end of said surface having the upper edges of its end walls in the same plane as said surface, a movable hopper for supplying said mold with material and parallel runways on said surface and along the upper edges of the side walls of said mold for supporting and guiding said hopper, a tamper mounted on an elongated member pivotally supported at one end at one side of said mold and adapted to swing to position with the end of said member projecting beyond the mold and means for engaging said end and moving it downward to cause the tamper to compress the material in the mold.

5. A brick molding machine comprising in combination a support, a mold mounted thereon including a removable bottom pallet longer than the mold, sheet metal side walls pivotally connected at their lower outer edges to said support for outward swinging and having a series of corresponding vertical slots spaced apart uniformly a distance equal to the width of a brick, a header parallel to the side of the mold and movable laterally towards and away from it having secured to it at right angles a series of elongated vertical walls corresponding in number and longitudinal position to the said slots and adapted to enter said slots when said header is moved inwardly and extend across the space between the side walls above the pallet thereby forming with the pallet and side walls a series of sections each having the proper dimensions to form a brick.

6. A brick molding machine comprising in combination a support, having two elevated, upwardly facing, aligned, horizontal surfaces spaced apart a distance substantially equal to the length of a mold, an expansible mold between the adjacent ends of said surfaces having the upper edges of its walls in the same plane as said surfaces and means for moving different brick materials along said surfaces and discharging them into said mold.

7. A brick molding machine comprising in combination a support, having two elevated, upwardly facing, aligned horizontal surfaces spaced apart a distance substantially equal to the length of a mold, a mold between the adjacent ends of said surfaces having the upper edges of its walls in the same plane as said surfaces and means for moving brick material along said surfaces and discharging it into said mold, consisting of longitudinally movable hoppers having discharge openings normally closed by said surfaces.

8. A brick molding machine comprising in combination a support, having two elevated, upwardly facing, aligned horizontal surfaces spaced apart a distance substantially equal to the length of a mold, a mold between the adjacent ends of said surfaces having the upper edges of its walls in the same plane as said surfaces and means for moving brick material along said surfaces and discharging it into said mold consisting of longitudinally movable hoppers having discharge openings normally closed by said surfaces, wheels supporting said hoppers and trackways for said wheels at the sides of said surfaces and mold, and stops at the outer ends of said surfaces to limit the outward movement of said hoppers.

9. A brick molding machine comprising in combination a support, having two elevated, upwardly facing, aligned, horizontal surfaces spaced apart a distance substantially equal to the length of a mold, a mold between the adjacent ends of said surfaces having the upper edges of its walls in the same place as said surfaces and means for moving brick material along said surfaces and discharging it into said mold, a tamper for compressing material in the mold carried by supporting member hinged at one end to the support for the mold.

10. A brick molding machine comprising in combination a support, having two elevated, upwardly facing, aligned, horizontal surfaces spaced apart a distance substantially equal to the length of a mold, a mold between the adjacent ends of said surfaces having the upper edges of its walls in the same plane as said surfaces and means for moving brick material along said surfaces and discharging it into said mold, a tamper adapted to fit the mold secured to a support hinged at one end to a fixed part of said mold support at a material distance laterally from said mold with its other end projecting across and beyond the mold when it is turned to position with the tamper over the mold, the said projecting end being for use in moving the tamper downward to compress the material in the mold.

11. A brick molding machine comprising in combination a support, having two elevated, upwardly facing, aligned, horizontal surfaces spaced apart a distance substantially equal to the length of a mold, a mold between the adjacent ends of said surfaces having the upper edges of its walls in the same plane as said surfaces and means for moving brick material along said surfaces and discharging it into said mold, a tamper adapted to fit the mold secured to a support at a material distance laterally from said mold with its other end projecting across and beyond the mold when it is turned to position with the tamper over the mold, the said projecting end having a hook for use in moving the tamper downward to compress the material in the mold and a foot pedal with attached means for detachably engaging said hook.

12. A brick molding machine comprising in combination a support, having two elevated, upwardly facing, aligned, horizontal surfaces spaced apart a distance substantially equal to the length of a mold, a mold between the adjacent ends of said surfaces having the upper edges of its walls in the same plane as said surfaces and means for moving brick material along said surfaces and discharging it into said mold, a tamper adapted to fit the mold secured to a support at a material distance laterally from said mold with its other end projecting across and beyond the mold when it is turned to position with the tamper over the mold, the said projecting end having a hook for use in moving the tamper downward to compress the material in the mold, a foot pedal with attached means for detachably engaging said hook, and a hand lever for moving said means for engaging said hook into position to permit such engagement.

13. A brick molding machine comprising in combination a support, having two elevated, upwardly facing, aligned, horizontal surfaces spaced apart a distance substantially equal to the length of a mold, a mold between the adjacent ends of said surfaces having the upper edges of its walls in the same plane as said surfaces and means for moving brick material along said surfaces and discharging it into said mold, the said mold consisting of a removable pallet constituting the bottom, side walls having horizontal lower edges hinged at their outer edges to horizontal supporting parts of said mold support whereby they may be turned outward but cannot be turned inward beyond vertical postion and end walls in the form of flat plates slidably mounted in corresponding slots in the side walls and movable longitudinally into and out of position.

14. A brick molding machine comprising in combination a support, having two elevated, upwardly facing, aligned, horizontal surfaces spaced apart a distance substantially equal to the length of a mold, a mold between the adjacent ends of said surfaces having the upper edges of its walls in the same plane as said surfaces and means for moving brick material along said surfaces and discharging it into said mold, the said mold consisting of a removable pallet constituting the bottom, side walls having horizontal lower edges hinged at their outer edges to horizontal supporting parts of said mold support whereby they may be turned outward but cannot be turned inward beyond vertical position and end walls in the form of flat plates slidably mounted in corresponding slots in the side walls and movable longitudinally into and out of position, narrow strips of metal secured at one end to the upper edge of one side wall at its ends and projecting therefrom at right angles whereby they act as shields constituting continuations of said horizontal surfaces over the upper edges of the end walls of the mold.

15. A brick molding machine comprising in combination a support, having two elevated, upwardly facing, aligned, horizontal surfaces spaced apart a distace substantially equal to the length of a mold, a mold between the adjacent ends of said surfaces having the upper edges of its walls in the same plane as said surfaces and means for moving brick material along said surfaces and discharging it into said mold, the said mold consisting of a removable pallet constituting the bottom, side walls having horizontal lower edges hinged at their outer edges to horizontal supporting parts of said mold support whereby they may be turned outward but cannot be turned inward beyond vertical position and end walls in the form of flat plates slidably mounted in corresponding slots in the side walls and movable longitudinally into and out of position, narrow strips of metal secured at one end to the upper edges of one side wall at its ends and projecting therefrom at right angles whereby they act as shields constituting continuations of said horizontal surfaces over the upper edges of the end walls of the mold, the said shields carrying at their outer ends means for interlocking with portions of the other side wall to prevent outturning of the side walls under pressure in the mold.

16. A brick mold comprising a support, a movable bottom pallet with flat upper and lower surfaces on said support, movable side and end walls and separator walls between and parallel to the end walls spaced apart at regular intervals equal to the width of a brick the said side walls being rotatable about axes below the upper surface of said pallet out of position and said end and separator walls having flat side surfaces in parallel planes and being movable in said planes out of operative position, means for securing said walls in operative position, the said pallet extending longitudinally material distances beyond the end walls and having secured to its lower surface transversely extending supports beyond the vertical planes of the mold ends and extending downwardly a distance somewhat greater than the thickness of the brick formed by the mold whereby the successive bricks made may be removed with the pallets and stacked for drying the transverse supports of one resting on the projecting ends of the one below it.

In testimony whereof I hereunto affix my signature.

JOHN POSPESHIL.